United States Patent [19]

Apisdorf

[11] Patent Number: 4,587,412
[45] Date of Patent: May 6, 1986

[54] MAGNETIC SENSOR FOR TRAY ACCEPTOR

[75] Inventor: Yair Apisdorf, Mayfield Hts., Ohio
[73] Assignee: Ardac, Inc., Eastlake, Ohio
[21] Appl. No.: 584,097
[22] Filed: Feb. 27, 1984
[51] Int. Cl.⁴ .............................................. G06K 7/08
[52] U.S. Cl. .................................. 235/449; 235/475; 360/2; 360/104
[58] Field of Search ................... 235/449, 475; 360/2, 360/104

[56] References Cited
U.S. PATENT DOCUMENTS 3,509,535  4/1970  Bernbe ........................... 235/449 X
3,836,753  9/1974  Pass ................................. 235/449
4,358,103 11/1982  Koike et al. ..................... 235/449 X Primary Examiner—David L. Trafton
Attorney, Agent, or Firm—Oldham, Oldham & Weber Co.

[57] ABSTRACT

A magnetic reading head is provided in a tray acceptor for determining the presence of magnetic characteristics in a paper tendered as a valid currency or note. Fundamentally, the invention comprises a spring assembly, receiving a magnetic reading head, which is adjustable to position the reading head in sensing engagement with the paper maintained in the tray and offered for validation. The magnetic reading head provides a series of pulses corresponding to the presence of magnetic characteristics in the paper to a capacitor which charges upon the receipt of each pulse. When the tray reaches a set position, the charge on the capacitor is sensed, and a determination is made as to whether the paper has sufficient magnetic characteristics to constitute a valid note or currency. A time delay circuit is provided such that the magnetic sensing function can be performed only once during a preset time period.

9 Claims, 6 Drawing Figures

4,587,412

MAGNETIC SENSOR FOR TRAY ACCEPTOR

TECHNICAL FIELD

The invention herein resides in the art of currency validators of the type typically used for determining the authenticity of currency, notes, or the like. More particularly, the invention relates to a tray acceptor type of currency validator in which a magnetic sensor is fixedly maintained above the tray for sensing the magnetic characteristics of the tendered paper.

BACKGROUND ART

Heretofore in the art, numerous types of currency validators or note acceptors have been known. Typically, such note acceptors are either tray acceptors in which the tendered paper is placed in a tray, moved to a test position, and thence scanned by a reticle to detect validity. Other sensors may be provided in such tray acceptors as, for example, to detect the presence or absence of particular colors. Slot acceptors are typically of the nature in which the tendered paper is placed into a slot and then conveyed past the various testing points at which different tests are performed on the paper to determine authenticity. The invention herein deals particularly with tray acceptors.

It is now known in the art that high resolution photocopies may defeat reticle tests in which the presence or absence of a particular pattern is sensed from the note. Similarly, certain photocopies are now capable of defeating the color sensors used in tray acceptors. However, it is known that the ink on valid currency and notes possesses magnetic properties; photocopies typically do not. Therefore, there is a need in the art for a tray acceptor type of validator which is capable of sensing the magnetic properties of the note or, as it is commonly called, the "magnetics" of the note.

DISCLOSURE OF THE INVENTION

In light of the foregoing, it is an object of a first aspect of the invention to provide a tray acceptor which incorporates a magnetic sensor.

An additional object of an aspect of the invention is to provide a tray acceptor which includes a magnetic sensor which senses a tendered paper as it moves with the tray past a sensing head.

An additional object of an aspect of the invention is to provide a magnetic sensor in a tray acceptor which is simplistic in design, while being accurate, reliable, and durable in operation.

The foregoing and other aspects of the invention which will become apparent as the detailed description proceeds are achieved by a tray acceptor for receiving and determining the authenticity of currency, comprising: a plate in juxtaposition to a path traveled by the currency maintained in a tray; a magnetic reading head; means connected to said plate for receiving said magnetic reading head and positionally maintaining it with respect to said path; and circuit means connected to said magnetic reading head for detecting the presence of magnetic characteristics on the currency.

BRIEF DESCRIPTION OF THE DRAWINGS

For a complete understanding of the objects, techniques, and structure of the invention, reference should be had to the following detailed description and accompanying drawings wherein.

BEST MODE FOR CARRYING OUT THE INVENTION

Figure 1:
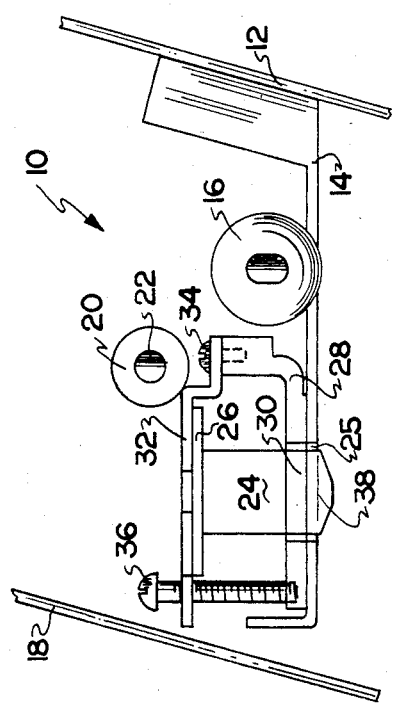
FIG. 1 is a side sectional illustrative view of the magnetic head mounting assembly of the invention as the same is positioned in a standard tray acceptor.

Referring now to the drawings, and more particularly FIG. 1, it can be seen that the magnetic head assembly of the invention is designated generally by the numeral 10 as the same is positioned in a standard tray acceptor. The tray acceptor includes a back plate portion 12 and a bottom plate portion 14 of the top roller plate. As shown, a top note roller 16 is positioned to roll against the note as it is slid in the tray beneath the bottom plate 14. The roller 16 maintains the note in a flat, secure position within the tray. It will, of course, be appreciated that a plurality of such rollers would be present, but are not shown in the partial view illustrated in FIG. 1. Of course, a front plate portion 18 of the top roller plate is also present, as partially shown, to complete the enclosure.

A reticle cart cam 20, shown in end view, is maintained on a rod 22 and is of standard nature for moving a reticle across the note once a homing switch has been tripped. As is well known to those skilled in the art, when the tray has been pushed into the acceptor to its home position, a cam causes the cam cart 20 to carry a reticle across the note to sense the presence or absence of a particular pattern on the note. Typically, the reticle would comprise a series of lines corresponding to the vertical lines in the cross-hatch pattern in the portrait background on a valid piece of currency. Such scanning and testing is well known in the art and is not elaborated upon herein. However, it will be understood that such a test would typically comprise the primary test for the validator of the invention. The magnetic sensing to be discussed hereinafter would comprise a secondary test. Of course, the tendered paper must satisfy both tests to be deemed authentic.

As further illustrated in FIG. 1, a magnetic head 24 protrudes through an opening 25 in the bottom plate 14. The magnetic head 24, as will be discussed hereinafter, is so positioned to make sensing contact with the paper in the tray to determine the presence or absence of magnetic characteristics in the paper or the ink thereon.

The magnetic head 24 is connected to a printed circuit board 26 having terminals thereon to connect to the circuitry of FIG. 6 to be discussed hereinafter. A plastic spring 28 is appropriately secured, as by screws, to the bottom plate 14. As the name implies, the plastic spring 28 is somewhat flexible to allow for adjustment as will be discusssed hereinafter. The spring 28 includes an opening 30 for receiving the head 24. A top mounting bracket 32 is connected to the printed circuit board 26, again by screws or the like. Screws 34 are provided to secure the top mounting bracket 32 to the plastic spring 28. An adjusting screw 36 is interposed between the top mounting bracket 32 and the plastic spring 28 to allow for adjustment of the placement of the sensing portion 38 of the magnetic head 24 so that the sensing portion 28 may be in proper contacting engagement with paper positioned in the tray beneath the plate 14.

Figure 2:
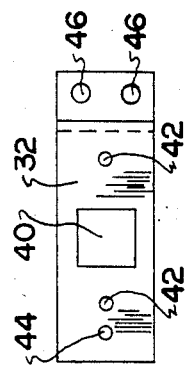
FIG. 2 is a top plan view of the head mounting bracket of the invention.
Figure 3:
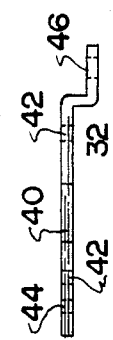
FIG. 3 is a front perspective view of the head mounting bracket of the invention.

With reference now to FIGS. 2 and 3, it can be seen that the top mounting bracket 32 includes an opening 40 in a center portion thereof to allow access to the terminals of the printed circuit board 26. These terminals allow the interconnection of the magnetic head 24 with the circuitry of FIG. 6 to be discussed hereinafter. Screw holes 42 are provided in the mounting bracket 32 to allow for interconnection with the printed circuit board 26. A threaded hole 44 is provided for receiving the adjusting screw 36 such that, when the screw 36 is bottomed as at FIG. 1, further turning of the screw 36 will elevate or lower the sensing portion 38 of the head 24. Of course, there also are provided holes 46 for receiving the screws 34 for making interconnection with the plastic spring 28.

Figure 4:
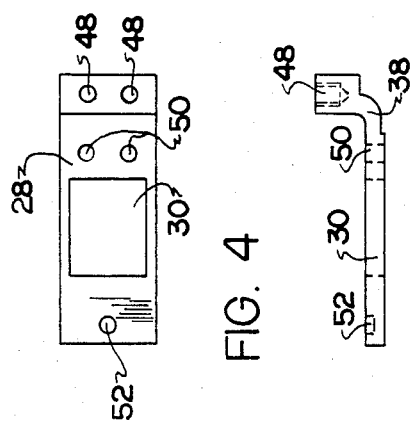
FIG. 4 is a top plan view of the adjustable spring assembly of the invention.
Figure 5:
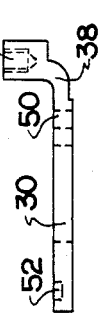
FIG. 5 is a front perspective view of the adjustable spring assembly of the invention.

With reference now to FIGS. 4 and 5, the details of the plastic spring 28 may be observed. It should, of course, be appreciated that while the spring 28 is preferably plastic, other suitable materials may be used. Plastic is preferred for purposes of durability and economy. In any event, the spring 28 has an opening 30 therein to allow the sensing portion 38 of the head 24 to extend therethrough. Screw holes 48 are provided for receiving the screws 34 in securing engagement with the top mounting bracket 32. Screw holes 50 are provided for receiving screws for making securing engagement with the bottom plate 14. A recess or detente 52 is provided for receiving the bottom of the screw 36, such bottoming of the screw allowing for the adjustment of the positioning of the sensor 38 as described above.

It should now be appreciated from an understanding of FIGS. 1-5 that the magnetic sensing head may be positioned above the tray in a tray acceptor to maintain a magnetic reading head above the paper deposited in the tray. The head may be adjusted so that sensing of the magnetic qualities of the paper may be achieved.

Figure 6:
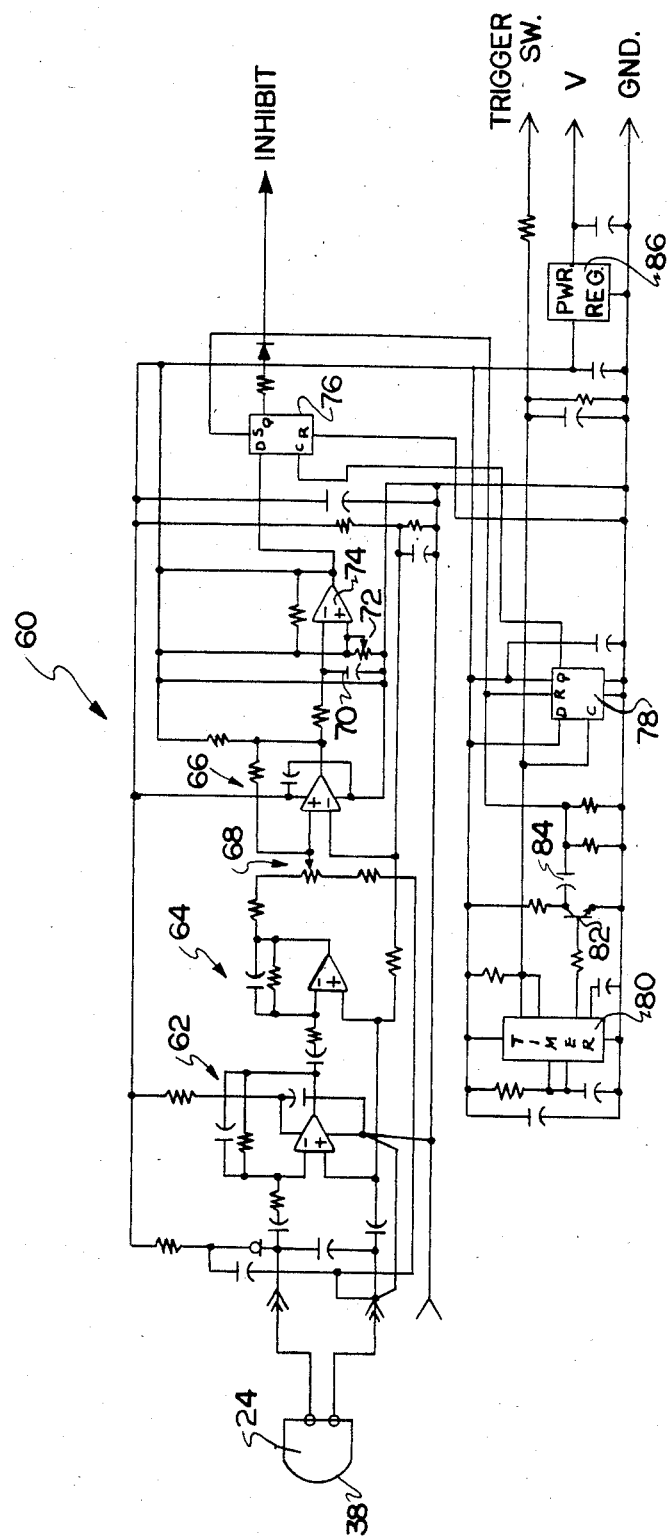
FIG. 6 is a circuit schematic of the magnetic sensing system of the invention.

With reference now to FIG. 6, the detailed circuitry 60 of the invention may be seen. The magnetic reading head 24 passes its output signals, corresponding to the strength of the "magnetics" on the paper, to a first amplifier 62, the same being interposed for purposes of scaling and amplification. A second stage of such scaling is achieved via the amplifier circuitry 64. Simply put, the amplifiers 62,64 have appropriate gain to amplify the small amplitude output signals from the head 24 to allow them to be properly sensed by the window comparator 66. A potentiometer 68 is provided at the positive input of the amplifier 66 to allow the amplifier 66 to only pass signals corresponding to the magnetics of the note, without passing the inherent noise signals associated with magnetic reading heads. In other words, the potentiometer 68 is adjusted so that the threshold is above the noise level of the head and only signals corresponding to "magnetics" are passed.

It will be appreciated that the magnetic sensor of the invention is positioned above the tray such that it will read the cross-hatch pattern in the portrait background of U.S. notes. The ink used to make such cross-hatch patterns has significant magnetic characteristics which are capable of being sensed by the head 24. Accordingly, the output of the amplifier 66 will be a train of pulses at a rate dependent upon the rate of movement of the tray past the reading head 24 which is maintained thereabove.

The output pulses of the amplifier 66 are passed to the integrating capacitor 70 which, in standard fashion, builds up a charge upon the receipt of each pulse. Of course, the capacitor 70 is discharging when it is not receiving such pulses. Accordingly, the tray must be moved at a reasonable rate of speed such that a charge may be built up on the capacitor 70 which exceeds the threshold of the amplifier 74 which is set by the potentiometer 72. When this condition exists, the comparator 74 changes states, applying that information to the data input of the D-type flip-flop 76.

A trigger switch is properly positioned for actuation by the tray at the end of the magnetic sensing function. The trigger switch applies a signal to the clock input of the latch 78, the output of which clocks the flip-flop 76 to transfer the data to the output thereof. If the charge on the capacitor 70 was sufficient to indicate a valid note as evidenced by the output of the amplifier 74 when the trigger switch is actuated, the magnetic test is passed and the system then proceeds with an analysis of the reticle tests and color sensing tests if the same are present. If the charge on the capacitor 70 was insufficient to indicate a valid note or currency, the output of the flip-flop 76 is an "inhibit" signal, terminating the test and rejecting the tendered paper. It should, of course, be appreciated that the trigger switch is actuated just before the tray reaches its home position, such position being that which actuates the reticle cam cart 20, as discussed above.

As further shown, a timer 80 is also actuated by the trigger switch. The timer 80 is set for a particular time, for example one second, such that one second after the tripping of the trigger switch an output pulse of fixed duration is emitted and applied to the base of the transistor 82. This signal is coupled across the capacitor 84 and is applied as a reset signal to the latch 78 and the flip-flop 76. Accordingly, the flip-flop 76 can only be clocked once every second. This limitation is provided so that the tray cannot be rapidly slid into and out of contact with the trigger switch in an attempt to build up a charge on the capacitor 70. The one second time duration is sufficient to allow the capacitor 70 to totally discharge. Accordingly, the capacitor 70 charges only as the note is slid past the magnetic head 24 at a maximum rate of once per second.

Of course, as further shown in the circuitry of FIG. 6, a power regulator 86 is provided to apply appropriate power to the circuitry just described.

Thus it can be seen that the objects of the invention have been achieved by the structure and circuitry presented hereinabove. While in accordance with the patent statutes only the best mode and preferred embodiment of the invention have been presented and described in detail, it is to be understood that the invention is not limited thereto or thereby. Accordingly, for an appreciation of the true scope and breadth of the invention, reference should be had to the appended claims.

What is claimed is:

1. A tray acceptor for receiving and determining the autenticity of currency, comprising:
   a plate in juxtaposition to a path traveled by the currency maintained in a tray;
   a magnetic reading head;
   means connected to said plate for receiving said magnetic reading head and positionally maintaining it with respect to said path;

circuit means connected to said magnetic reading head for detecting the presence of magnetic characteristics on the currency; and wherein said means for receiving said magnetic reading head comprises a base spring portion connected to said plate and having an opening therein for receiving said head, and a top mounting bracket connected at a first end thereof to a first end of said base spring portion, and in adjustable communication with said base spring portion at a second end thereof, said magnetic reading head being maintained between said base spring portion and said top mounting bracket.

2. The tray acceptor according to claim 1 wherein said adjustable communication is obtained by a screw in adjustable communication between said top mounting bracket and said base spring portion at respective second ends thereof.

3. The tray acceptor according to claim 1 wherein said top mounting bracket has an opening therein communicating with a circuit board interconnected between said top mounting bracket and said magnetic reading head.

4. The tray acceptor according to claim 1 wherein said circuit means comprises an integrating capacitor charged as a function of the output of said magnetic reading head.

5. The tray acceptor according to claim 4 wherein said circuit means further includes means for sensing the charge on said integrating capacitor at the time the currency reaches a certain point with respect to said magnetic reading head.

6. The tray acceptor according to claim 5 wherein said sensing means comprises a comparator connected to said integrating capacitor.

7. The tray acceptor according to claim 6 wherein said comparator presents an output corresponding to the level of charge of said integrating capacitor to a latch circuit, said latch circuit being clocked by a trigger switch activated when the currency reaches said certain point.

8. The tray acceptor according to claim 7 which further includes circuit means for enabling said latching circuit at a particular time following actuation of said trigger switch.

9. The tray acceptor according to claim 2 wherein said base spring portion comprises an L-shaped member of flexible material.

* * * * *